(12) United States Patent
Shyu (10) Patent No.: US 11,083,283 B1
(45) Date of Patent: Aug. 10, 2021

(54) TABLE ASSEMBLY AND METHOD (71) Applicant: EP Family Corp., Walnut, CA (US)

(72) Inventor: Chin-Hung Shyu, Walnut, CA (US)

( * ) Notice: Subject to any disclaimer, the term of this patent is extended or adjusted under 35 U.S.C. 154(b) by 0 days.

(21) Appl. No.: 16/788,132

(22) Filed: Feb. 11, 2020

(51) Int. Cl.
*A47B 13/00* (2006.01)
*A47B 13/02* (2006.01)
*A47B 7/00* (2006.01)

(52) U.S. Cl.
CPC .............. *A47B 13/003* (2013.01); *A47B 7/00* (2013.01); *A47B 13/02* (2013.01); *A47B 2013/006* (2013.01); *A47B 2200/0012* (2013.01); *A47B 2200/0018* (2013.01); *A47B 2200/0028* (2013.01)

(58) Field of Classification Search
CPC ....... A47B 3/06; A47B 47/00; A47B 47/0016; A47B 47/0091; A47B 47/0025; A47B 47/0058; A47B 47/0008
USPC ....... 108/180, 186, 187, 190, 153.1, 158.12, 108/155
See application file for complete search history.

(56) References Cited

U.S. PATENT DOCUMENTS

| | | | | |
|---|---|---|---|---|
| 2,533,831 A | * | 12/1950 | Molla | A47B 3/12 108/186 |
| 2,615,770 A | * | 10/1952 | Curtis | A47B 13/003 108/155 |
| 3,604,369 A | * | 9/1971 | Maslow | A47B 57/265 108/147.13 |
| RE28,244 E | * | 11/1974 | Evans | A47B 47/03 108/157.13 |
| 4,158,998 A | * | 6/1979 | Clement | A47B 57/16 108/147.15 |
| 4,422,385 A | * | 12/1983 | Rutsche | A47B 17/00 108/150 |
| 4,582,001 A | * | 4/1986 | Leikarts | A47B 57/265 108/106 |
| 4,593,826 A | * | 6/1986 | Bustos | A47B 57/265 108/147.12 |
| 4,630,550 A | * | 12/1986 | Weitzman | A47B 13/06 108/155 |
| 4,691,644 A | * | 9/1987 | Frydman | A47B 47/03 108/187 |
| 4,754,712 A | * | 7/1988 | Olson | A47B 57/265 108/107 |

(Continued)

FOREIGN PATENT DOCUMENTS

FR  2578298 A1 * 9/1986 ............. A47B 47/04

*Primary Examiner* — Jose V Chen
(74) *Attorney, Agent, or Firm* — Tommy SF Wang; Wang IP Law Group, P.C.

(57) ABSTRACT

The present, application discloses a table assembly including a first lower support, a second lower support, a first upper support, a second upper support and a table top. The first lower support includes a pair of first hollow rods, a first bottom base and a first top base coupling the first hollow rods. The second lower support includes a pair of second hollow rods, a second bottom base and a second top base coupling the second hollow rods. The first upper support includes a first upper rod and a pair of first connectors coupled to one of the first hollow rods and one of the second hollow rods. The second upper support includes a second upper rod and a pair of second connectors coupled to another first hollow rod and another second hollow rod. The table top is supported by the upper rods and the top bases.

13 Claims, 6 Drawing Sheets

(56) References Cited

U.S. PATENT DOCUMENTS

| | | | | |
|---|---|---|---|---|
| 5,289,784 | A * | 3/1994 | Waibel | A47B 13/02 108/157.1 |
| 5,579,703 | A * | 12/1996 | King | A47B 87/0223 108/158.11 |
| 5,779,070 | A * | 7/1998 | Dickinson | A47B 57/265 211/181.1 |
| 6,260,488 | B1 * | 7/2001 | Yang | A47B 57/545 108/107 |
| 6,450,107 | B1 * | 9/2002 | Sanz Novales | A47B 13/003 108/153.1 |
| 6,902,074 | B2 * | 6/2005 | Albrecht | A01K 63/006 211/182 |
| 7,124,695 | B2 * | 10/2006 | Buechler | A47B 45/00 108/180 |
| 8,079,315 | B2 * | 12/2011 | Berent | A47C 4/03 108/158.12 |
| 8,671,644 | B2 * | 3/2014 | Huang | A47B 13/06 52/653.2 |
| 9,084,478 | B2 * | 7/2015 | Ortega | A47B 13/06 |
| 9,247,809 | B1 * | 2/2016 | Hsu | A47B 47/0083 |
| 2003/0167982 | A1 * | 9/2003 | Yang | A47B 13/02 108/155 |
| 2003/0205180 | A1 * | 11/2003 | Bishop | A47B 13/003 108/158.12 |
| 2011/0220602 | A1 * | 9/2011 | Chen | A47B 96/02 211/153 |
| 2016/0007745 | A1 * | 1/2016 | Parshad | A47B 17/00 108/27 |

* cited by examiner

…

TABLE ASSEMBLY AND METHOD

TECHNICAL FIELD OF THE INVENTION

The present application generally relates to tables, and more particularly, to a table assembly and method for assembling the table assembly.

BACKGROUND OF THE INVENTION

There are many different styles of tables such as dining table or conference table. Some of them are one-pieced while some of them are assembled. For one-pieced table, the transportation is not easy since the overall size is too large. For the assembled table, it is required to assemble multiple components such as four vertical legs, four horizontal rods and table tops. The process is cumbersome and easy to lose small elements such as screw nut.

Therefore, a need remains for a table assembly and method for assembling thereof to provide a convenient transportation and easily assembled structure.

SUMMARY OF THE INVENTION

The present application discloses a table assembly and method for assembling thereof to provide a convenient transportation and easily assembled structure.

The table assembly comprises a first lower support, a second lower support, a first upper support, a second upper support and a table top. The first lower support comprises a pair of first hollow rods, a first bottom base coupling the pair of first hollow rods and a first top base coupling the pair of first hollow rods. The second lower support comprises a pair of second hollow rods, a second bottom base coupling the pair of second hollow rods and a second top base coupling the pair of second hollow rods. The first upper support comprises a first upper rod and a pair of first connectors coupled to one of the first hollow rods and one of the second hollow rods, correspondingly, wherein each of the first connectors comprises at least one first protrusion. The second upper support comprises a second upper rod and a pair of second connectors coupled to another first hollow rod and another second hollow rod correspondingly, wherein each of the second connectors comprises at least one second protrusion. The table top is supported by the first upper rod, the second upper rod, the first top base and the second top base.

In various exemplary embodiments, each of the first hollow rods comprises a first opening and each of the second hollow rods comprises a second opening. The first openings, are located at ends of the pair of the first hollow rods coupled to the first connector and the second connector; and the second openings are located at ends of the pair of the second hollow rods coupled to the first connector and the second connector. Shapes of the first openings and shapes of the second openings are corresponded to shape of the first upper rod and shape of the second upper rod. The first openings are square and the second openings are square.

In various exemplary embodiments, the first lower support further comprises a pair of first pads coupled to the pair of the first hollow rods; and the second lower support further comprises a pair of second pads coupled to the pair of the second, hollow rods.

In various exemplary embodiments, each of the first connectors comprises three first protrusions.

The first protrusions are aligned in a line.

In various exemplary embodiments, each of the second connectors comprises three second protrusions. The second protrusions are aligned in a line.

In various exemplary embodiments, the table assembly further comprises a plurality of screws for coupling the table top onto the first upper rod, the second upper rod, the first top base and the second top base. Specifically, the table assembly comprises ten screws. The table top is coupled to the first upper rod via three of the screws; the table top is coupled to the second upper rod via three of the screws; the table top is coupled to the first top base via two of the screws; and the table top is coupled to the second top base via two of the screws.

A method for assembling the aforementioned table assembly is also disclosed. The method comprises inserting one of the first connectors into one of the first hollow rods; inserting another first connector into one of the second hollow rods; inserting one of the second connectors into another first hollow rod; inserting another second connector into another second hollow: and coupling the table top onto the first upper rod, the second upper rod, the first top base and the second top base.

In various exemplary embodiments, the step of coupling the table top onto the first upper rod, the second upper rod, the first top base and the second top base comprises screwing the table top onto the first upper rod, the second upper rod, the first top base and the second top base.

Based on the above, the table assembly of the present application allows user to assemble the table assembly simply via inserting the first connectors and the second connectors into the first hollow rods and the second hollow rods.

In addition, the first protrusions and the second protrusions may also increase the stability between the connectors and hollow rods. Furthermore, the table top may be disposed more stably since the first openings and the second openings allow the first upper rod and the second upper rod to be fit with the first lower support and the second lower support.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF DISCLOSED EMBODIMENTS

Reference will now be made in detail to the present representative embodiments of the present application, examples of which are illustrated in the accompanying drawings. Wherever possible, the same reference numbers are used in the drawings and the description to refer to the same or like parts.

Figure 1A:
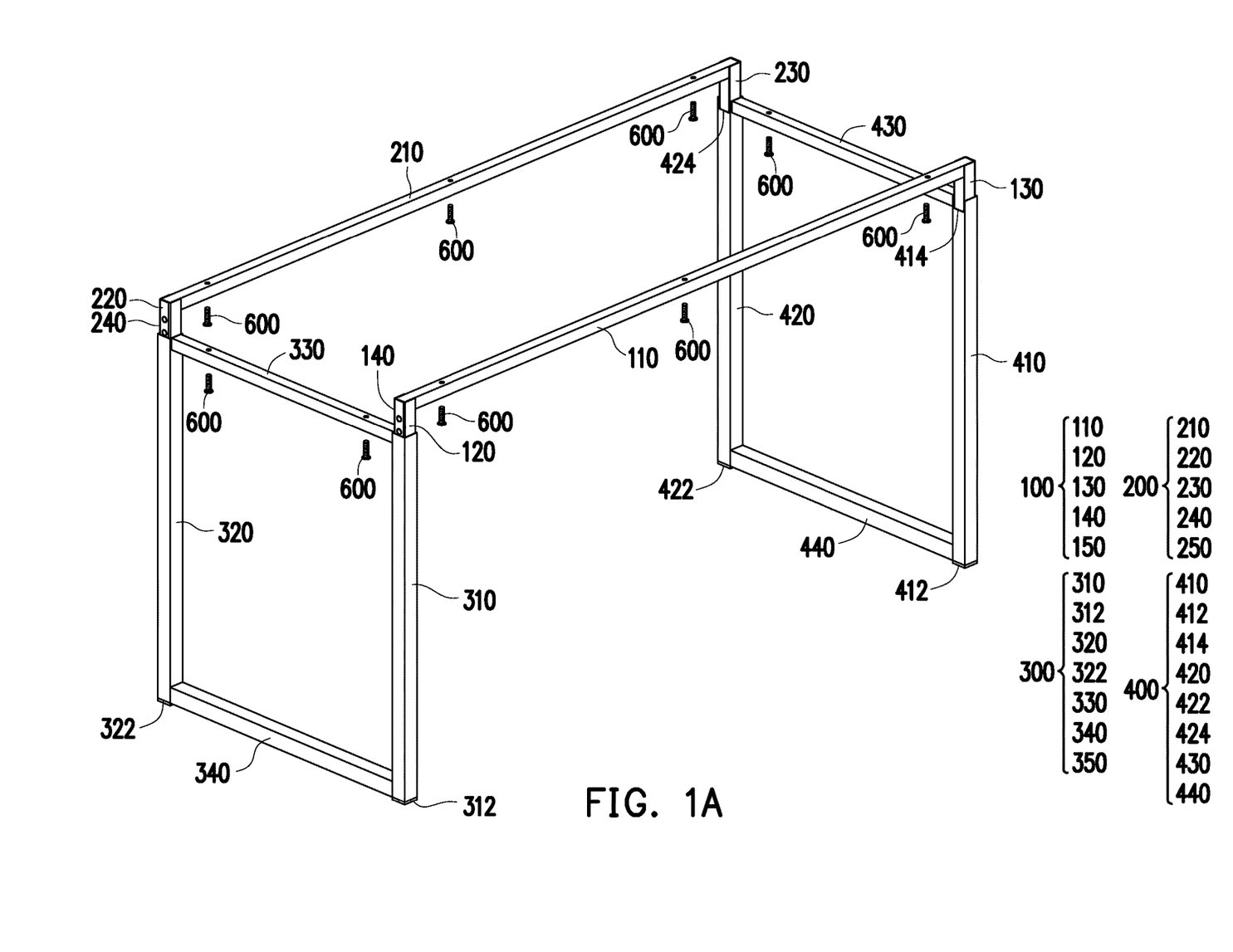
FIGS. 1A-1C show a method for assembly a table assembly of the present application.
Figure 1B:
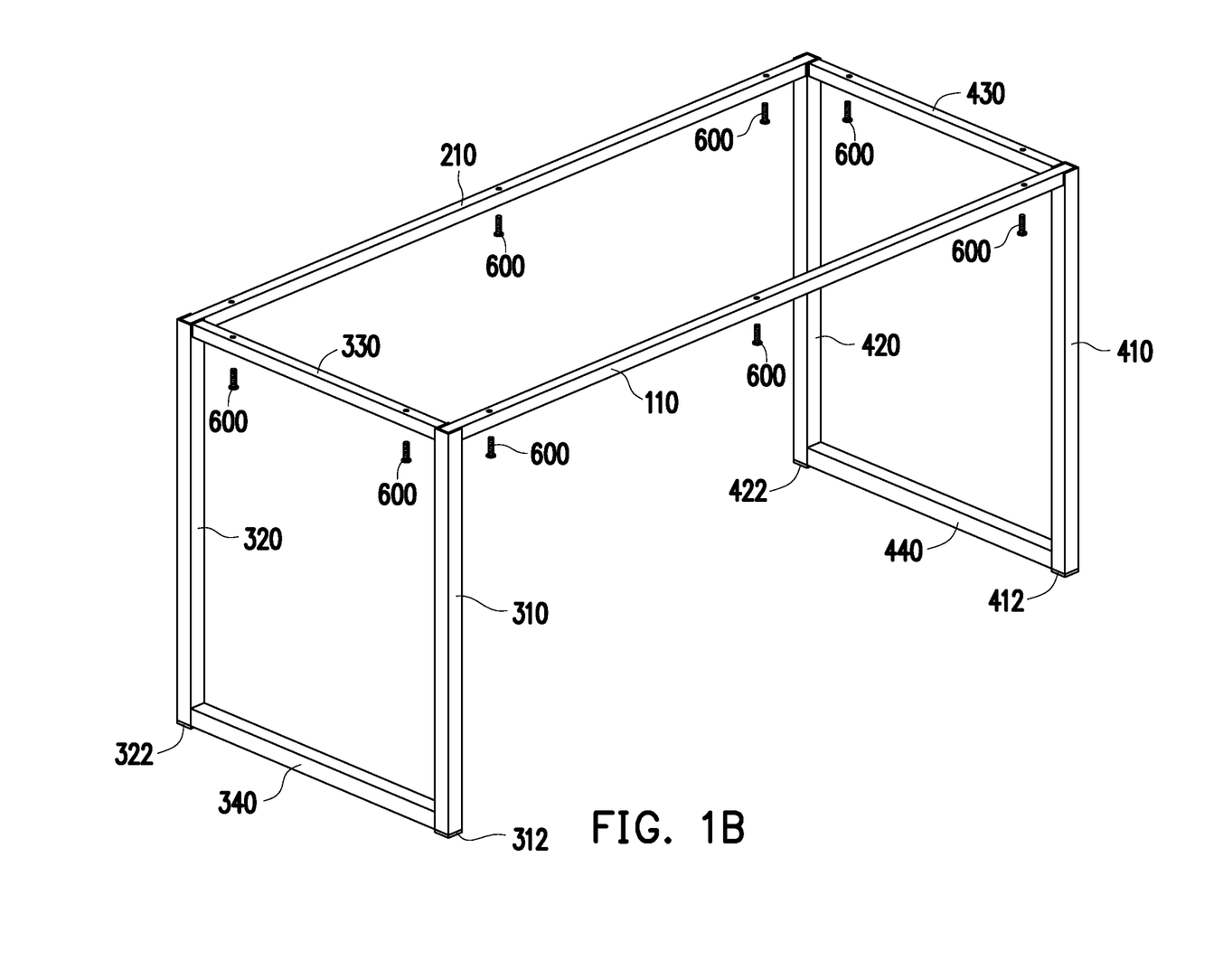
Figure 1C:
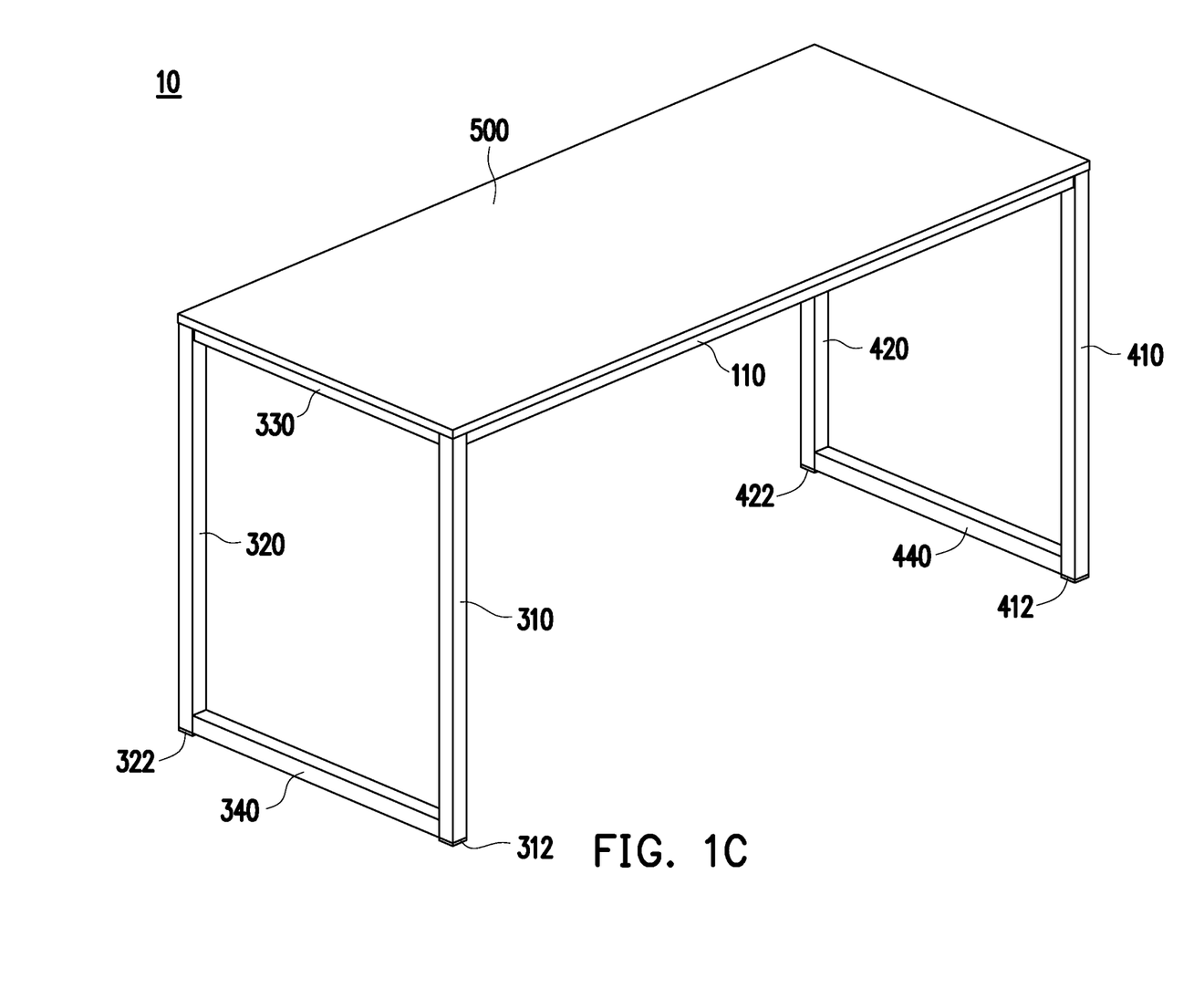

FIGS. 1A-1C show a method for assembly a table assembly 10 of the present application.

Referring to FIGS. 1A-1C, the table assembly 10 comprises a first upper support 100, a second upper support 200, a first lower support 300 and a second lower support 400.

The first upper support 100 comprises a first upper rod 110 and a pair of first connectors 120/130. The first connector 120 comprises at least one first protrusion 140. The first connector 130 comprises at least one protrusion (not separately illustrated).

The second upper support 200 is the same as the first upper support 100. The second upper support 200 comprises a second upper rod 210 and a second connectors 220/230. The second connector 220 comprises at least one second protrusion 240. The second connector 230 comprises at least one protrusion (not separately illustrated).

The first lower support 300 comprises a pair of first hollow rods 310320, a first top base 330 and a first bottom base 340. The pair of first hollow rods 310/20 is coupled by the first top base 330 and the first bottom base 340.

The second lower support 400 is the same as the first lower support 300. The second lower support 400 comprises a pair of second hollow rods 410/420, a second top base 430 and a second bottom base 440. The pair of second hollow rods 410/420 is coupled by the second, top base 430 and the second bottom base 440.

The table top 500 is supported by the first upper rod 110, the second upper rod 210, the first top base 330 and the second top base 430.

Figure 2A:
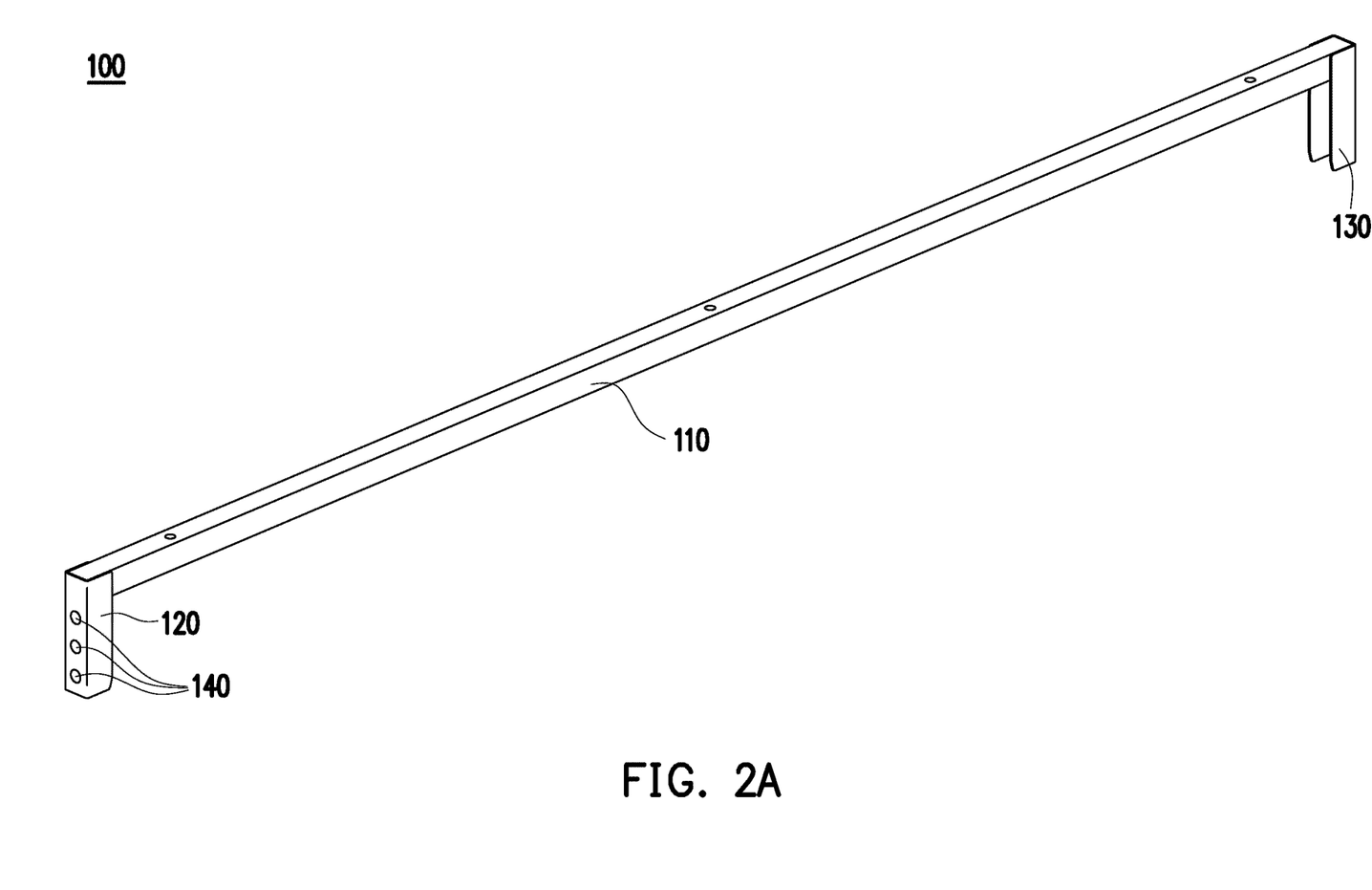
FIGS. 2A-2C show an upper support of the table assembly.
Figure 2B:
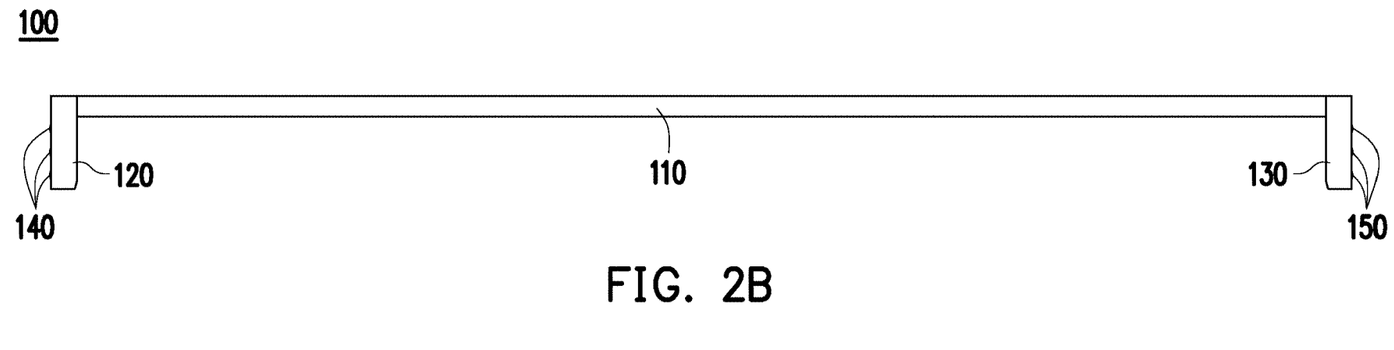
Figure 2C:
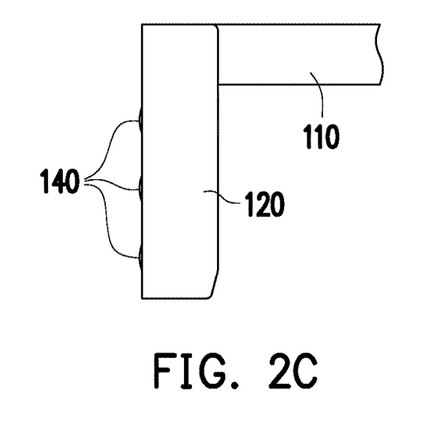

FIGS. 2A-2C show an upper support of the table assembly 10. FIGS. 2A-2C take the first upper support 100 as an example. The first connector 120 is coupled to one end of the first upper rod 110. The first connector 130 is coupled to another end of the first upper rod 110. The shape of the first connector 120/130 is as "⊏" for fitting inside the first hollow rod 310 and the second hollow rod 410. However, the present application is not limited thereto, the first connectors 120/130 can be any kind of shapes as long as the first connectors 120/130 can be inserted into the first hollow rod 310 and the second hollow rod 410.

The first connector 120 comprises three protrusions 140 as an example. However, the amount of the protrusions 140 is not limited, in the present application. In addition, the first protrusions 140 are aligned in a line. By the above structure, the stability may be enhanced when inserting the first connector 120 into the first hollow rod 310 since the protruded protrusion 140 can increase the friction and force against the internal, surface of the first hollow rod 310. In the present application, the first connector 120 and the first connector 130 are the same. However, the present application is not limited thereto, the first connector 120 and the first connector 130 can be different in size, length etc.

Figure 3:
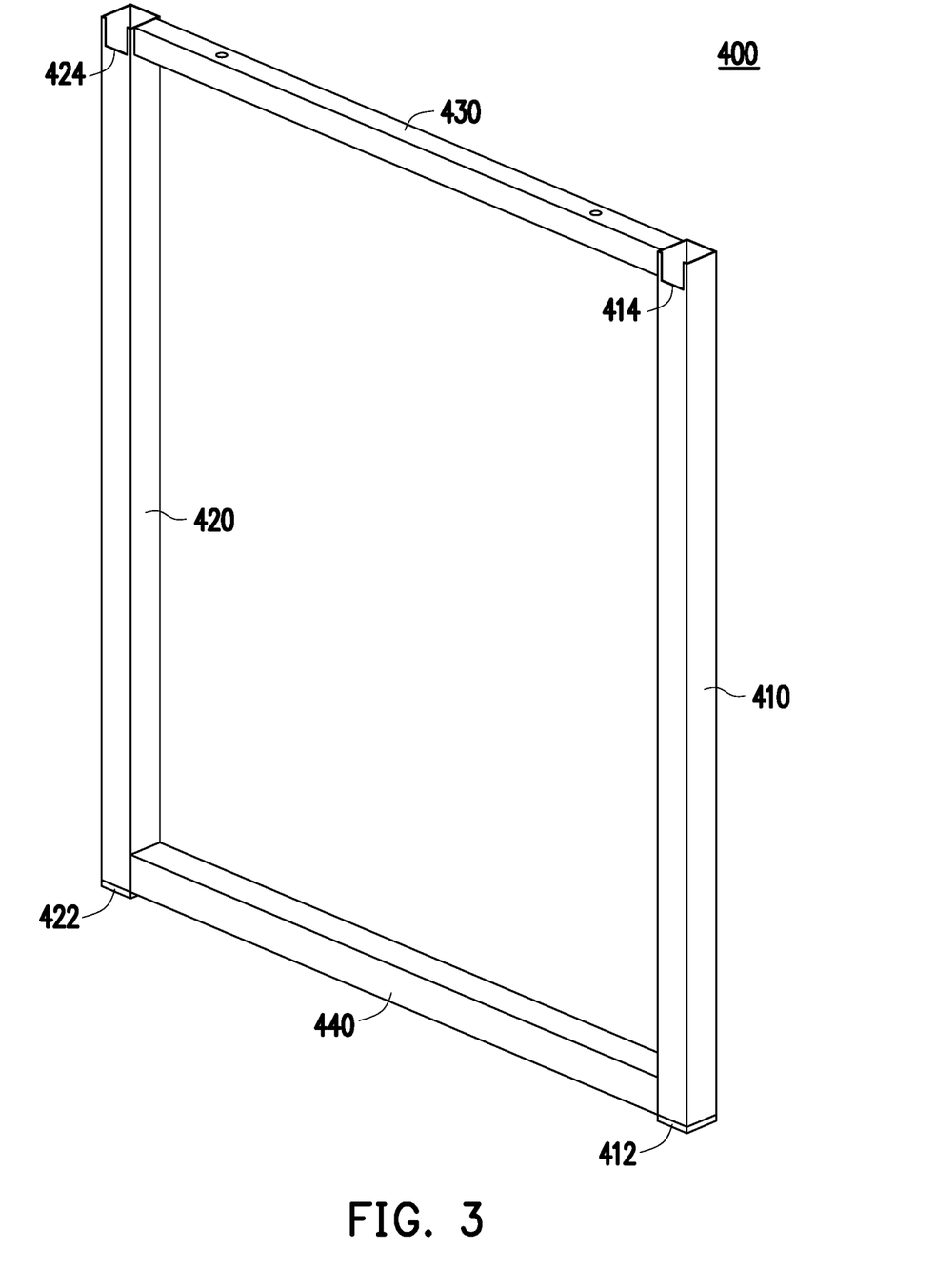
FIG. 3 shows a lower support of the table assembly.

FIG. 3 shows a lower support of the table assembly 10. FIG. 3 takes the second lower support 400 as an example.

The second hollow rod 410 comprises a second pad 412 and a second opening 414. The second pad 412 is coupled at one end of the second hollow rod 410. The second opening 414 is located at another end of the second hollow rod 410. Specifically, the second opening 414 is located at the end of the second hollow rod 410 coupled to the first connector 120 or the second connector 220. The shape of the second opening 414 is corresponded to shape of the first upper rod 110 or the second upper rod 210. In the present application, the second opening 414 is square as an example.

The second hollow rod 420 is the same as the second hollow rod 410. Specifically, the second hollow rod 420 also comprises a second pad 422 and a second opening 424. The second pad 422 is coupled at one end of the second hollow rod 420. The second opening 424 is located at another end of the second hollow rod 420. In detail, the second opening 424 is located at the end of the second hollow rod 420 coupled to the first connector 120 or the second connector 220. The shape of the second opening 424 is corresponded to shape of the first upper rod 110 or the second upper rod 210. In the present application, the second opening 424 is square as an example.

As such, the table top 500 may be disposed more stably since the second openings 414/424 allow the first upper rod 110 and the second upper rod 210 to be fit with the second lower support 400.

Referring back to FIGS. 1A-1C the second upper support 200 is the same as the first upper support 100 as mentioned earlier. Specifically, the first upper support 200 also comprises a second upper rod 210, a second connector 220, a second connector 230. The first connector 220 comprises protrusions 240. The first connector 230 comprises protrusions (not separately illustrated) as well.

In addition, the first lower support 300 is the same as the second lower support 400 as mentioned earlier. In detail, the first hollow rod 310 comprises a first pad 312 and a first opening (not separately illustrated). The first pad 312 is coupled to the first hollow rod 310. The first hollow rod 320 comprises a first pad 322 and a first opening (not separately illustrated). The first pad 322 is coupled to the first hollow rod 320. The first openings (not separately illustrated) are located at ends of the first hollow rods 310/320 coupled to the first connector 120 and the second connector 220. In addition, shapes of the first openings (not separately illustrated) are corresponded to shape of the first upper rod 110 and shape of the second upper rod 210. Specifically, the first openings (not separately illustrated) are square as the second openings 414/424.

The table assembly 10 may further comprise screws 600. Specifically, the table assembly 10 comprises ten screws 600. However, the present application is not limited thereto. The table assembly 10 may comprise any amount of screws as long as the table top 500 can be fixed. In detail, the table top 500 is coupled to the first upper rod 110 via three screws 600, to the second upper rod via three screws 600, to the first top base 330 via two screws 600, and to the second top base 430 via two screws 600.

As shown in FIGS. 1A-1B, the first step of the method for assembling the table assembly 100 is inserting the first connector 120 into the first hollow rod 310. Next, inserting the first connector 130 into the second hollow rod 410. After that, inserting the second connector 220 into the first hollow rod 320. Last, inserting the second connector 230 into the second hollow rod 420. It should be noted that the above order may be changed as long as all connectors 120/130/220/230 can be inserted into the corresponded hollow rods.

Next, as shown in FIG. 1C, coupling the table top 500 onto the first upper rod 110, the second upper rod 210, the first top base 330 and the second top base 430. More specifically, this step comprises screwing the screws 600 to couple the table top 500 onto the first upper rod 10, the second upper rod 210, the first top base 330 and the second top base 430.

Based on the above, the table assembly of the present application, allows user to assemble the table assembly simply via inserting the first connectors and the second connectors into the first hollow rods and the second hollow rods.

In addition, the first protrusions and the second protrusions may also increase the stability between the connectors and hollow rods. Furthermore, the table top may be disposed more stably since the first openings and the second openings allow the first upper rod and the second upper rod to be fit with the first lower support and the second lower support.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A table assembly, comprising:
    a first lower support comprising:
        a pair of first hollow rods;
        a first bottom base coupling the pair of first hollow rods; and
        a first top base coupling the pair of first hollow rods;
    a second lower support comprising:
        a pair of second hollow rods;
        a second bottom base coupling the pair of second hollow rods; and
        a second top base coupling the pair of second hollow rods;
    a first upper support comprising:
        a first upper rod; and
        a pair of first connectors coupled to one of the first hollow rods and one of the second hollow rods correspondingly, wherein each of the first connectors comprises:
            a first main body coupled to the first upper rod;
            a first inclined portion connected to the first main body; and
            three first protrusions located at the first main body;
    a second upper support comprising:
        a second upper rod; and
        a pair of second connectors coupled to another first hollow rod and another second hollow rod correspondingly, wherein each of the second connectors comprises:
            a second main body coupled to the second upper rod;
            a second inclined portion connected to the second main body; and
            three second protrusions located at the second main body, and
    a table top supported by the first upper rod, the second upper rod, the first top base and the second top base.

2. The table assembly as claimed in claim 1, wherein each of the first hollow rods comprises a first opening and each of the second hollow rods comprises a second opening.

3. The table assembly as claimed in claim 2, wherein the first openings are located at ends of the pair of the first hollow rods coupled to the first connector and the second connector; and the second openings are located at ends of the pair of the second hollow rods coupled to the first connector and the second connector.

4. The table assembly as claimed in claim 3, wherein shapes of the first openings and shapes of the second openings are corresponded to shape of the first upper rod and shape of the second upper rod.

5. The table assembly as claimed in claim 4, wherein the first openings are square and the second openings are square.

6. The table assembly as claimed in claim 1, wherein the first lower support further comprises a pair of first pads coupled to the pair of the first hollow rods; and the second lower support further comprises a pair of second pads coupled to the pair of the second hollow rods.

7. The table assembly as claimed in claim 1, wherein the first protrusions are aligned in a line.

8. The table assembly as claimed in claim 1, wherein the second protrusions are aligned in a line.

9. The table assembly as claimed in claim 1, further comprising a plurality of screws for coupling the table top onto the first upper rod, the second upper rod, the first top base and the second top base.

10. The table assembly as claimed in claim 9, wherein the table assembly comprises ten screws.

11. The table assembly as claimed in claim 10, wherein the table top is coupled to the first upper rod via three of the screws; the table top is coupled to the second upper rod via three of the screws; the table top is coupled to the first top base via two of the screws; and the table top is coupled to the second top base via two of the screws.

12. A method for assembling a table assembly of claim 1, comprising:
    inserting one of the first connectors into one of the first hollow rods;
    inserting another first connector into one of the second hollow rods;
    inserting one of the second connectors into another first hollow rod;
    inserting another second connector into another second hollow; and
    coupling the table top onto the first upper rod, the second upper rod, the first top base and the second top base.

13. The method for assembling a table assembly as claimed in claim 12, wherein the step of coupling the table top onto the first upper rod, the second upper rod, the first top base and the second top base comprises screwing the table top onto the first upper rod, the second upper rod, the first top base and the second top base.

* * * * *